A. G. BOOZER, Jr. & G. HILL.
DOFFING MACHINE.
APPLICATION FILED SEPT. 13, 1912.

1,142,014.

Patented June 8, 1915.
7 SHEETS—SHEET 1.

A. G. BOOZER, Jr. & G. HILL.
DOFFING MACHINE.
APPLICATION FILED SEPT. 13, 1912.

1,142,014.

Patented June 8, 1915.
7 SHEETS—SHEET 4.

Witnesses:

Inventors:
Arthur G. Boozer Jr.
George Hill

A. G. BOOZER, Jr. & G. HILL.
DOFFING MACHINE.
APPLICATION FILED SEPT. 13, 1912.

1,142,014.

Patented June 8, 1915.
7 SHEETS—SHEET 5.

Witnesses:

Inventors:
Arthur G. Boozer Jr.
George Hill
By Luther L. Miller
Atty.

A. G. BOOZER, Jr. & G. HILL.
DOFFING MACHINE.
APPLICATION FILED SEPT. 13, 1912.

1,142,014.

Patented June 8, 1915.
7 SHEETS—SHEET 7.

Witnesses:

Inventors:
Arthur G. Boozer Jr.
George Hill
By Luther L. Miller

UNITED STATES PATENT OFFICE.

ARTHUR GEORGE BOOZER, JR., OF GREENVILLE, AND GEORGE HILL, OF TUCAPAU, SOUTH CAROLINA, ASSIGNORS TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

DOFFING-MACHINE.

1,142,014.            Specification of Letters Patent.          Patented June 8, 1915.

Application filed September 13, 1912. Serial No. 720,136.

*To all whom it may concern:*

Be it known that we, ARTHUR GEORGE BOOZER, Jr., and GEORGE HILL, citizens of the United States, residing, respectively, at Greenville, Greenville county, and Tucapau, county of Spartanburg, in the State of South Carolina, have invented certain new and useful Improvements in Doffing-Machines, of which the following is a specification.

This invention relates to doffing machines arranged to travel along the sides of spinning machines for doffing the filled bobbins from the spindles and supplying empty bobbins thereto.

One of the objects of the invention is to provide an improved magazine and feeding means for the empty bobbins.

Another object is to provide an improved mechanism for driving the doffing machine.

Further objects and advantages of the invention will be set forth in the specification and particularly pointed out in the claims.

Figure 1:
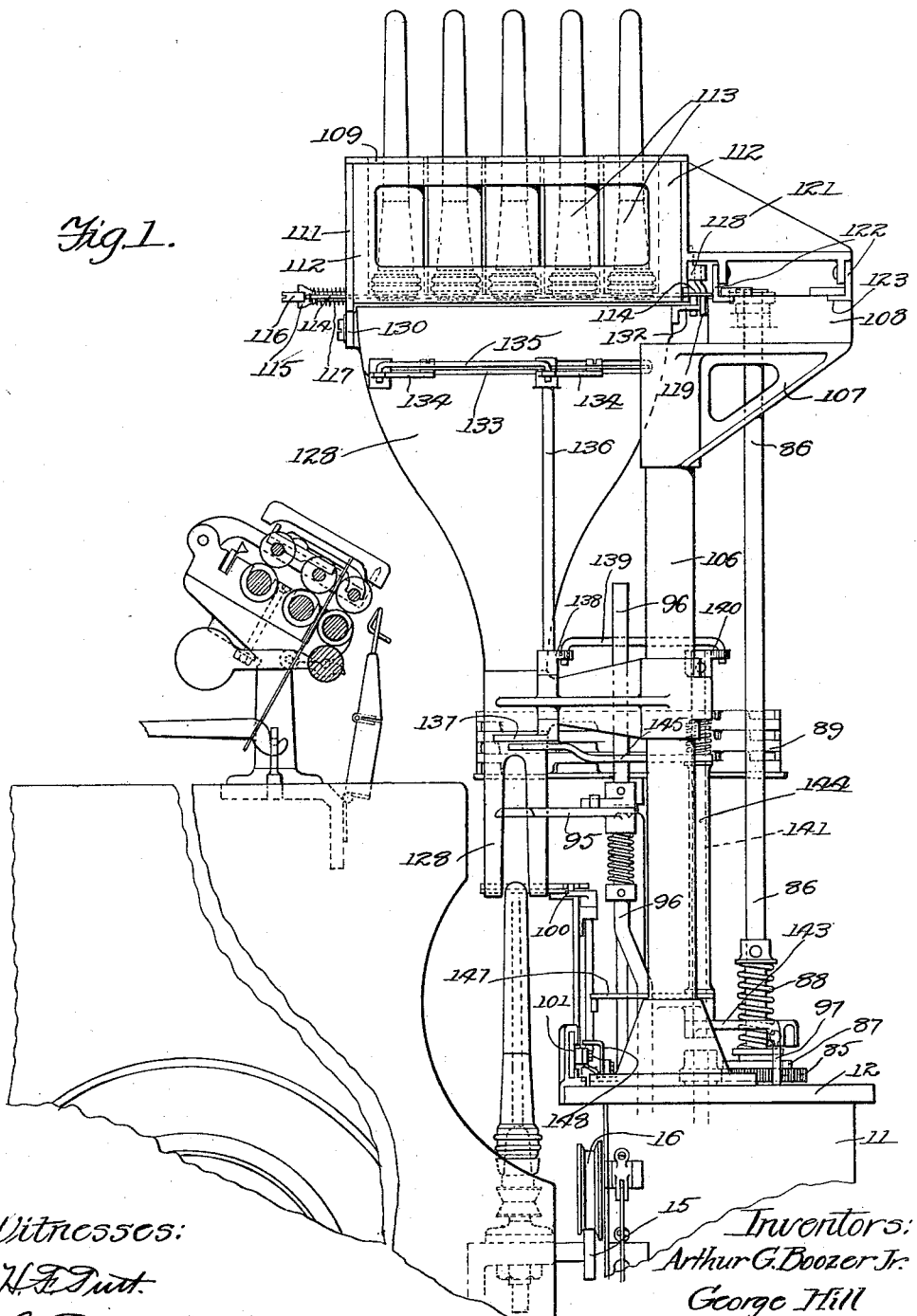
Figure 2:
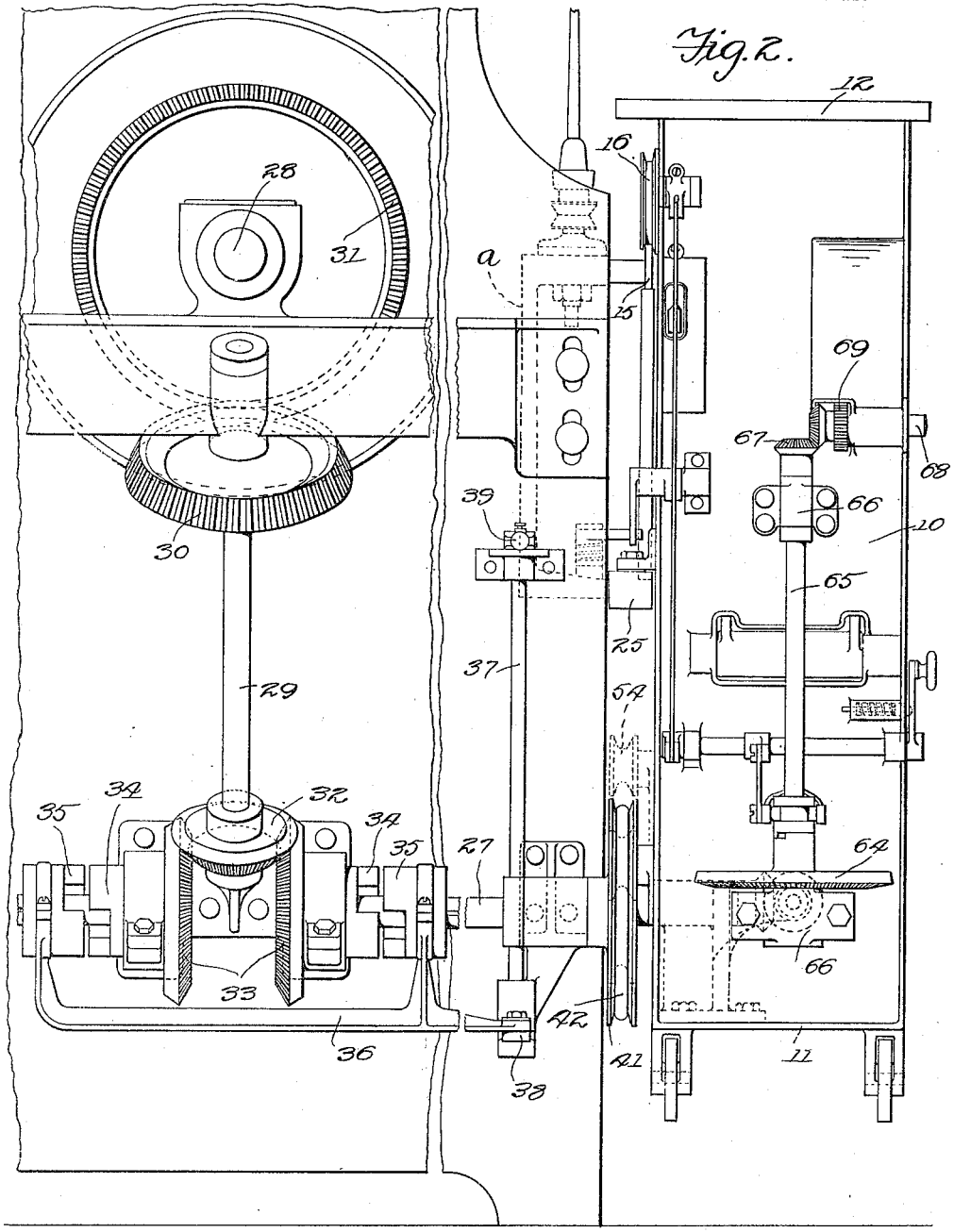
Figure 3:
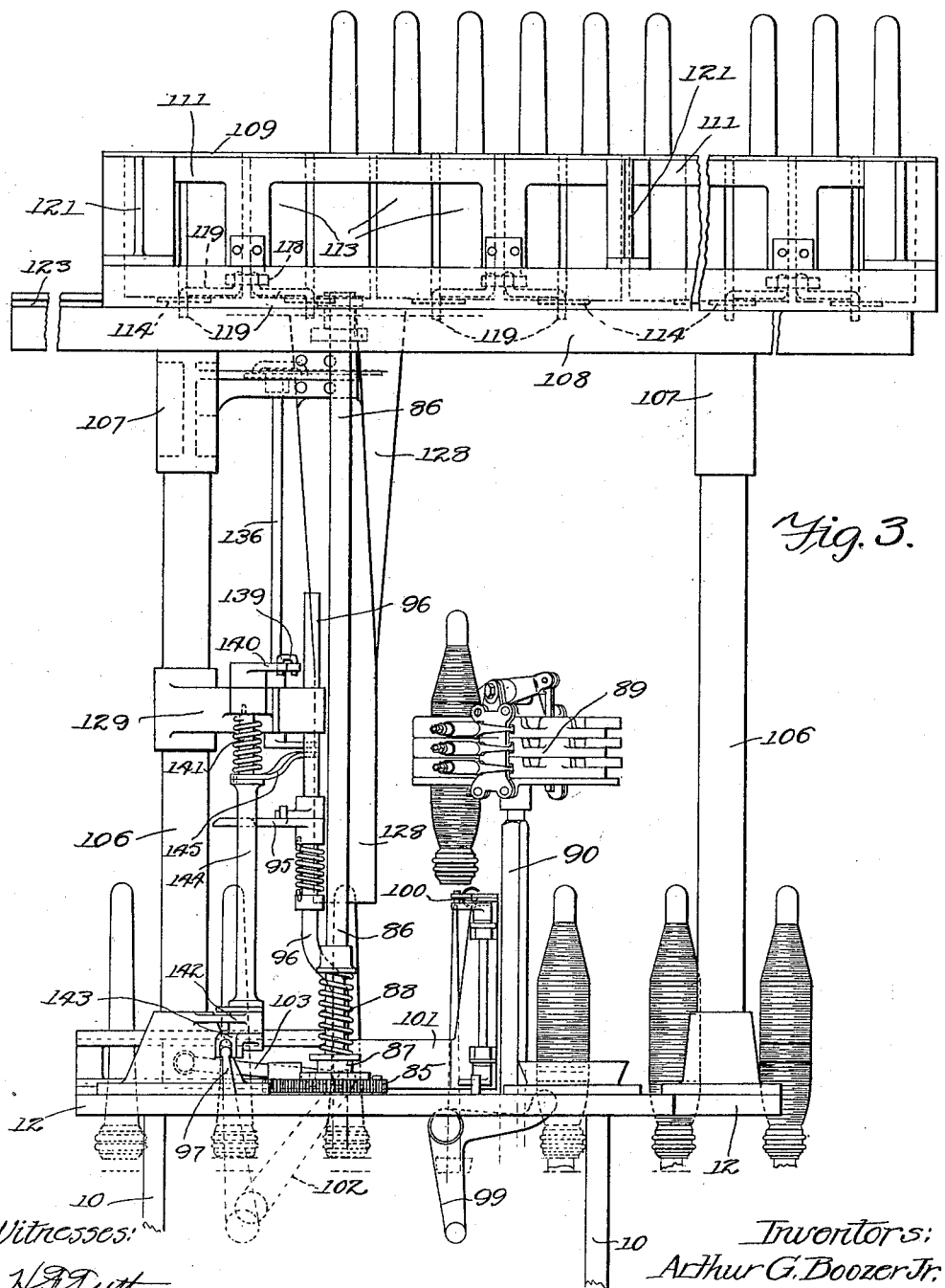
Figure 4:
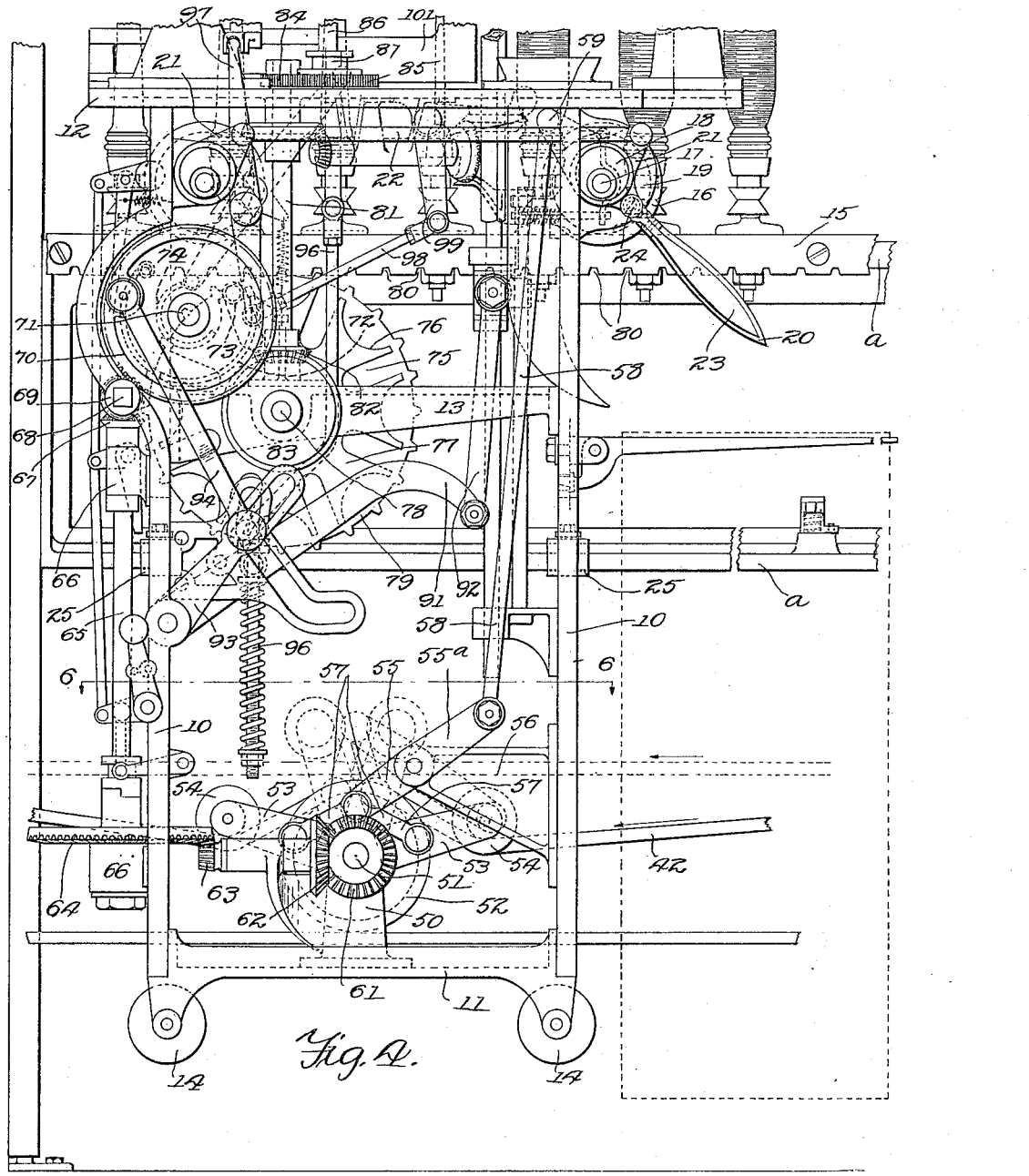
Figure 5:
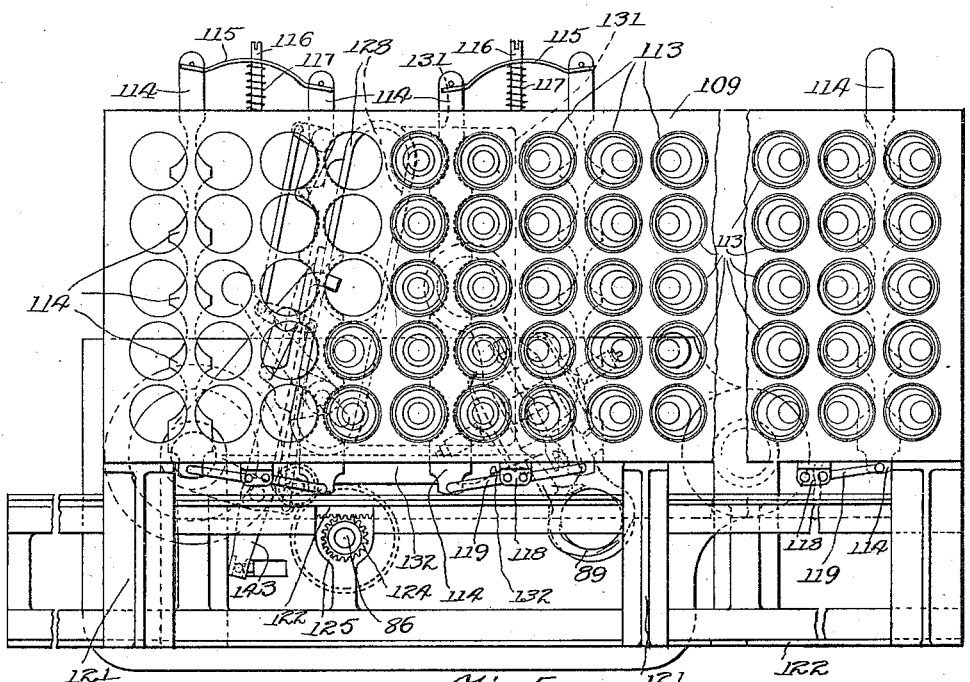
Figure 6:
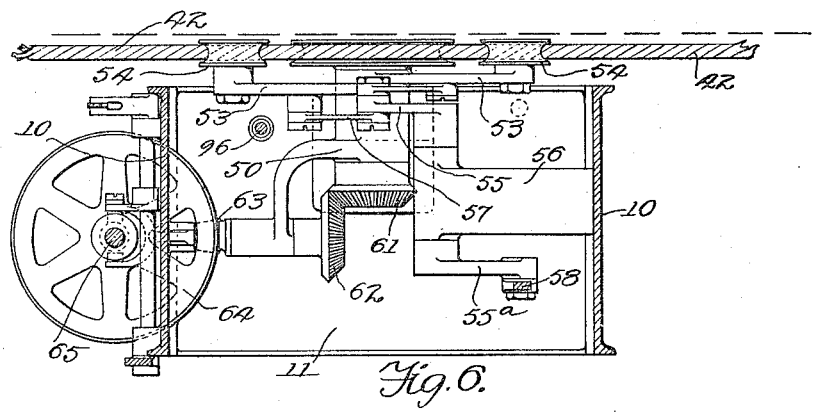
Figure 7:
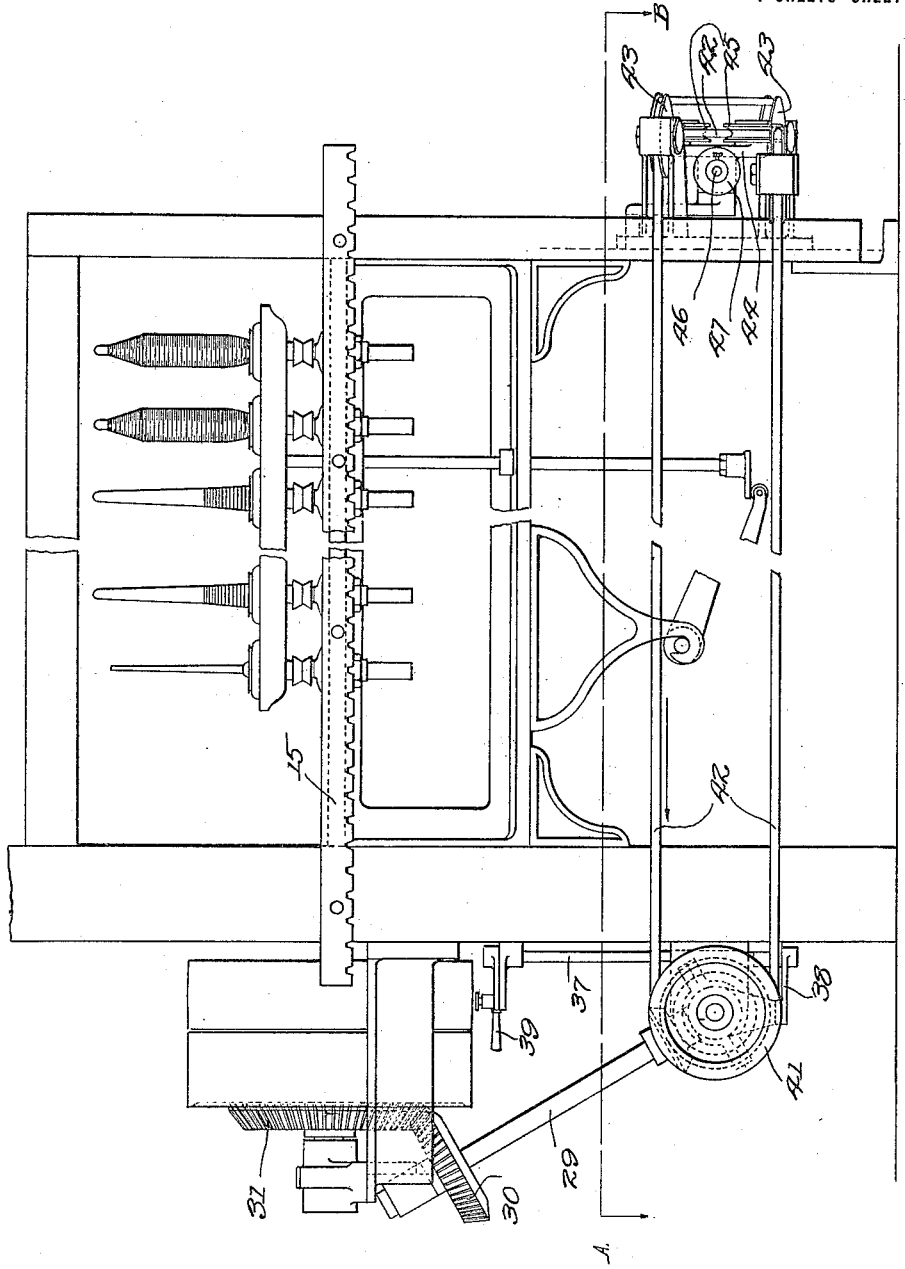
Figure 8:
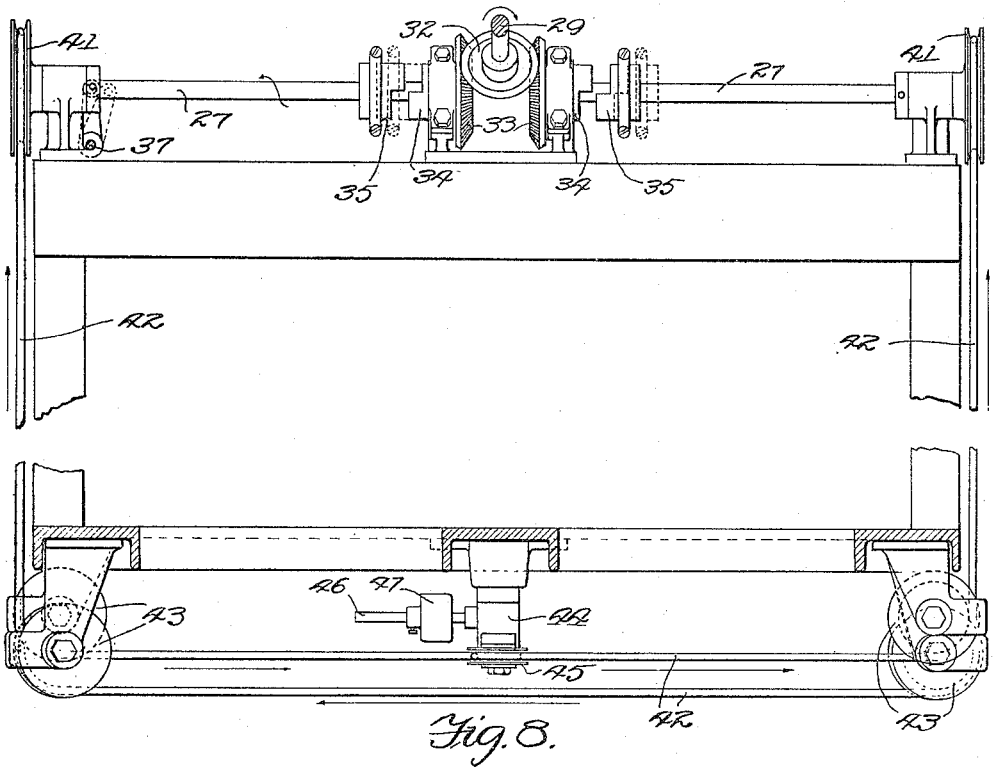
Figure 9:
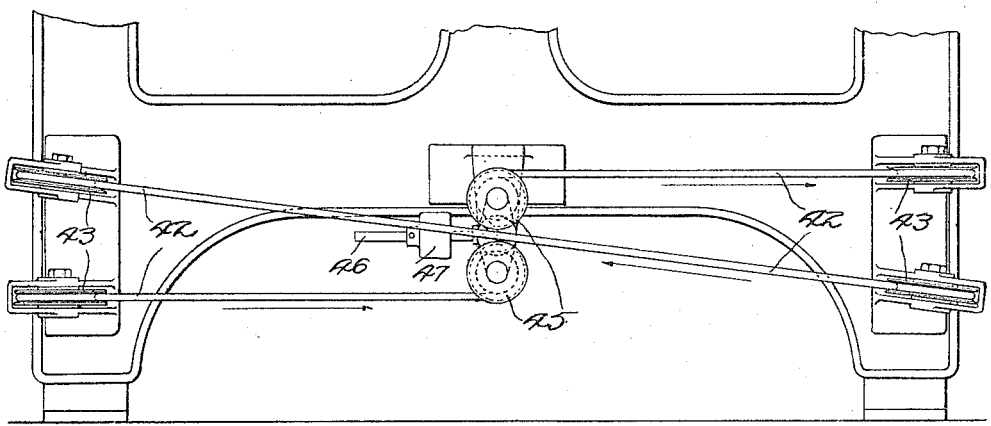

In the accompanying drawings, Figure 1 is a side elevation of the upper portion of a doffing machine embodying the features of our invention, the figure also showing a portion of a spinning frame. Fig. 2 is a side elevation of the lower portion of the doffer and the adjacent part of the spinning frame. Figs. 3 and 4 are front elevations of the upper and lower portions of the doffer, respectively. Fig. 5 is a top plan view showing the magazine. Fig. 6 is a horizontal sectional view through the lower portion of the doffer illustrating a portion of the driving means. Fig. 7 is a side elevation of a spinning machine with parts broken out and illustrating a driving means employed in connection with the doffing machine herein shown. Fig. 8 is a top plan view of the spinning frame with parts broken out, and illustrating the driving means. Fig. 9 is a fragmental end elevation of the spinning frame and the driving means.

The embodiment of our invention which we have herein shown by way of example comprises a framework consisting of sides 10, a base 11 connecting the lower portions of said sides, a horizontal table 12 at the upper ends of said sides, and a cross-piece 13 extending between the sides near their middle portion. When the doffer is not in association with the spinning frame, it rests upon rollers 14 mounted in the base 11. The bolster rail *a* of the spinning frame has a guide rail 15 fixed to its upper flange, upon which guide rail a pair of grooved rollers 16 upon the doffer is arranged to travel, said rollers supporting the doffer upon the spinning frame clear of the floor. The rollers 16 are fixed upon short shafts 17 (Fig. 4) which are rotatably mounted in eccentric bearings 18 carried in supports 19 upon the sides of the framework. A handle 20 fixed to one end of the bearings 18 provides means for rotating the bearings, after the rollers have been associated with the upper edge of the guide rail 15, to raise the doffer and bring a toothed driving wheel, to be later described, into engagement with its rack. Each of the bearings 18 is provided with a lug 21, and these lugs are connected by means of a link 22, to provide for simultaneous movement of the bearings. A latch handle 23 carried by the handle 20 is arranged to operate a locking pin 24 which holds the bearings 18 in their adjusted positions. A pair of rollers 25 carried by the sides 10 are arranged to bear against the lower flange of the bolster rail *a*.

In the present instance the doffer is driven by means carried by the spinning frame. This means comprises a shaft 27 (Fig. 2) mounted upon one end of the spinning machine, said shaft being driven from the main shaft 28 of the machine through the medium of a diagonal shaft 29 having at one end a bevel pinion 30 meshing with a bevel gear 31 fixed upon said main shaft of the spinning machine, the other end of said diagonal shaft having a bevel pinion 32 meshing with a pair of opposite bevel pinions 33 upon the shaft 27. Each of the latter pinions is provided with a clutch member 34 arranged to be engaged by one of two clutch members 35 slidably mounted upon the shaft 27 and rigidly connected by a crosshead 36. A vertical shaft 37 has at its lower end a crank-arm 38 pivoted to one end of the crosshead 36, the upper end of said vertical shaft having a handle 39 thereon for rotating it. When said handle is operated, the clutch members 35 will be moved into engagement with their complementary members 34 for driving the shaft 27 in opposite directions.

Upon opposite ends of the shaft 27 are mounted two sheaves 41 over which runs an endless cable 42, the two runs of the cable extending along both sides of the spinning frame and around one end thereof. At the last mentioned end of the frame are positioned guide sheaves 43, over which the cable extends, the two runs of the cable crossing each other at this point. Rotatably mounted upon said end of the spinning frame is a bracket 44 having a pair of small sheaves 45 thereon over which one run of the cable extends. An angular arm 46 fixed to the tiltable bracket 44 carries a weight 47 which tends to swing said bracket and the sheaves 45 to keep the cable taut, as is clearly shown in Fig. 9.

The means provided on the doffing machine for engaging the driving cable is constructed as follows: A bearing bracket 50 (Fig. 4) carried upon the base 11 of the framework has rotatably mounted therein a horizontal shaft 51 upon the rear end of which is fixed a driving sheave 52. A pair of arms 53, pivoted upon the shaft 51, carry at their outer ends sheaves 54 arranged to overlie the cable 42. Said arms 53 are adapted to be swung downwardly to carry the cable into engagement with the driving sheave 52 by means of an arm 55 fixed on a shaft which is mounted in a bracket 56, said arm being connected to the arms 53 by short links 57. Another arm 55ª fixed on said shaft is connected by means of a link 58 with an arm 59 rigid with one of the eccentric bearings 18 for the doffer supporting rollers 14. The arms 55 and 55ª and their shaft constitute a rigid lever. When the hand lever 20 is operated in associating the doffer with the spinning frame, the cable 42 will be automatically moved into driving engagement with the driving sheave 52.

The forward end of the shaft 51 carries a bevel gear 61 which meshes with a similar gear 62 upon the end of a shaft mounted in the bearing bracket 50, the opposite end of the last mentioned shaft having thereon a bevel pinion 63 meshing with a gear 64 which is loosely mounted upon the lower end of a vertical shaft 65 running in bearings 66 upon one of the frame sides 10. The upper end of the shaft 65 has fixed thereon a bevel pinion 67 meshing with a pinion upon a horizontal stub shaft 68. The latter shaft has a pinion 69 which meshes with a gear-wheel 70 fixed upon the main actuating shaft 71 on the machine. The stub shaft 68 may have its forward end squared, or otherwise suitably shaped, to be engaged by a hand crank so that the machine may be driven by hand in bringing the parts to their normal starting position.

The main actuating shaft 71 has fixed on its rear end a cam disk 72 upon one side of which is a roller stud 73 and an arcuate portion 74 arranged to engage with slots 75 and recesses 76 respectively in a starwheel 77 which is fixed upon a shaft 78 mounted in the crosspiece 13. A toothed propelling wheel 79 also fixed upon the shaft 78 engages with rack teeth 80 formed upon the lower edge of the guide rail 15 upon which the doffer is supported, and said toothed wheel is arranged to be given a series of intermittent rotations through the connection just described. A vertical shaft 81 has at its lower end a bevel pinion 82 meshing with a bevel gear 83 on the shaft 78. The upper end of the shaft 81 has a pinion 84 which meshes with a gear 85 rotatable on the lower end of a vertical shaft 86, to be later described. A collar 87 is slidably but nonrotatably mounted on the shaft 86 above the gear 85 has a clutch engagement with said gear 85, and the collar being pressed downwardly by a coiled spring 88. When the collar is raised the shaft 81 may be rotated without moving the shaft 86, as will be later explained.

The general operating mechanism of the machine is substantially similar to that shown in our co-pending application Serial No. 621,317, filed April 15, 1911, and need not here be described in detail. Briefly, this mechanism comprises a doffer head 89 fixed on the upper end of a vertical reciprocatory rod 90 which is moved by a lever 91 connected thereto by a link 92. A lever 93 rigid with the lever 91 is connected to a crankpin on the gear wheel 70 by means of a link 94. The bobbin seater 95 is yieldably mounted on a vertically slidable rod 96 having its lower end yieldably connected to the lever 91. A lever 97 for rocking a shaft to be later described is arranged to be operated by a cam (not shown) on the rear side of the gear wheel 70. Said cam also reciprocates a link 98 connected to a bell-crank lever 99 which opens and closes the doffer head. The thread severing means 100 is mounted on a horizontal slide 101 (Fig. 3) which is operated by a lever 102 connected thereto by a link 103.

The magazine for the empty bobbins is carried by a pair of vertical standards 106 rising from the table 12. Upon the upper ends of these standards is fixed a pair of brackets 107 which carry a horizontal support 108 upon which the bobbin magazine is arranged to travel. The magazine proper comprises a box-like structure having top and bottom plates 109 and 110 and side and end plates 111 and 112. The top and bottom plates are provided with a series of openings in which the ends of a series of short vertical tubes 113 fit. The bobbins are adapted to stand upright in these tubes and are held from falling through the magazine by means of latch-plates 114 slidably mounted in the lower portion of the magazine and transversely thereof, said plates having arcuate recesses at opposite sides thereof so formed that when the plates are slidden into proper position the recesses will coincide with the tubes 113 and permit the bobbins in said tubes to escape. One of the latch-plates is provided for every two rows of the bobbin tubes 113, there being in the present instance twenty-four rows of five tubes each in the magazine. The rear ends of the latch-plates 114 are connected in pairs by yokes 115 mounted upon pins 116 projecting rearwardly from the magazine. Coiled springs 117 surrounding the pins 116 and positioned between the magazine and the yokes 115 tend to hold the latch-plates in their rearmost position, in which position said plates obstruct the lower ends of the tubes 113 and prevent the escape of bobbins. Upon the forward side-wall of the magazine are fixed small brackets 118 in which are pivoted crank members 119 having their free angular ends lying in openings in the forward ends of the latch-plates 114 and projecting some distance below said latch-plates. These ends of the crank members are arranged to be engaged by a stationary cam-plate, to be presently described, for the purpose of drawing the successive latch-plates forwardly to release the bobbins from the magazine.

A plurality of brackets 121 project forwardly from the magazine and carry at their lower sides a pair of angular guide rails 122 running longitudinally of the magazine, said rails traveling in guideways 123 formed in the support 108. The rear one of the guide rails has rack teeth formed thereon, which teeth are arranged to be engaged by a pinion 124 fixed upon the upper end of the vertical shaft 86 which runs in a bearing 125 in the support 108. The shaft 86 is given a series of partial rotations during the operation of the machine to advance the magazine step by step. When the magazine reaches the end of its travel the clutch collar 87 is lifted to disengage it from the gear 85, when the magazine may be pushed back on its guide, the shaft 81 rotating idly.

Beneath the magazine is positioned a donning tube 128 having its upper end widened and flattened to extend transversely beneath the magazine. The lower portion of the donning tube is mounted upon a bracket 129 carried by one of the standards 106 and the upper portion of said tube is secured to the magazine support 108. At the rear edge of the upper end of the tube is an anti-friction roller 130 upon which the rear edge of the magazine rests. A plate 131 extends laterally from the upper edge of the donning tube in a direction opposite to the direction of travel of the magazine, said plate being adapted to prevent the bobbins in the spaces released by the latch-plates 114 from falling before they reach the donning tube. To the forward edge of the plate 131 is secured a cam-plate 132, along the forward edge of which the ends of the crank members 119 ride to draw the latch-plates 114 forwardly and release two rows of bobbins at a time.

Referring to Fig. 5, it will be seen that the upper end of the donning tube extends at an angle with reference to the transverse rows of bobbin tubes in the magazine; therefore, as the magazine is advanced the bobbins in any particular row will drop successively into the donning tube. A stop-plate 133 extends through a slot in the upper portion of the donning tube, said plate being fixed to a pair of bell-crank levers 134 pivoted to lugs on said donning tube. Said bell-crank levers are connected by a link 135 for a simultaneous movement. The forward one of said levers is fixed upon the upper end of a vertical rock-shaft 136, the lower end of said shaft being mounted in the bracket 129. Fixed upon the extreme lower end of said shaft is a stop member 137 arranged to extend through a slot in the lower portion of the donning tube to obstruct a falling bobbin therein. The parts are so arranged that when the stop plate 133 is projected into the donning tube the stop member 137 will be drawn therefrom and vice-versa. The shaft 136 is arranged to be rocked by means of a crank-arm 138 thereon, which is connected by a link 139 to a crank-arm 140 fixed upon the upper end of a vertical rock-shaft 141, which has its ends mounted in the bracket 129 and a lug 142 upon the standard 106 respectively; the lower end of said shaft has fixed thereon a crank-arm 143 which is rocked by means of the lever 97 previously described. The rock-shaft 141 has a sleeve 144 rotatably mounted thereon and upon the upper end of this sleeve is an arm 145 having an angular end adapted to enter the donning tube and act as a stop for the bobbins therein; a coiled spring 146 tends to throw said arm toward the donning tube. The lower end of the sleeve 144 has thereon an angular arm 147 which is arranged to be engaged by a projection 148 carried by the link 103 of the reciprocable shearing mechanism for the purpose of rotating the sleeve and thereby withdrawing the projection on the upper arm 145 from the donning tube.

Our invention is susceptible of various modifications and we therefore do not limit ourselves to the embodiment herein disclosed.

We claim as our invention:

1. The combination of a spinning machine having a driving cable mounted thereon, said cable extending longitudinally along one side of the spinning machine and a doffer arranged to travel along said side of the spinning machine and having means adapted to be driven by said cable.

2. The combination of a spinning machine having a driving cable mounted thereon, and a doffer having a sheave adapted to be driven by said cable and means for moving the cable into engagement with said sheave.

3. A doffing machine having a driving sheave, a cable for driving said sheave, and means on the doffer for moving the cable into engagement with said sheave.

4. In combination, a spinning machine having a driving cable mounted thereon, a doffer having a driving sheave adapted to engage said cable, a pair of pivoted arms on the doffer, sheaves carried by said arms and adapted to engage said cable, and means for swinging said arms to move the cable into engagement with said driving sheave.

5. In combination, a spinning machine having a doffer supporting rail and a driving cable mounted thereon, and a doffer having rollers to run on said rail, vertically adjustable bearings for said rollers, a driving sheave adapted to be engaged by said cable, means for moving said cable into engagement with said sheave, and an operative connection between said means and said vertically adjustable bearings.

6. In combination, a spinning machine having a transverse shaft mounted on one end thereof, means for driving said shaft, a pair of sheaves on the ends of said shaft, a plurality of sheaves mounted on the opposite end of the spinning machine, an endless cable running over all of said sheaves and extending along both sides of the spinning machine, and a doffing machine adapted to be driven by said cable.

7. In combination, a spinning machine, an endless driving cable, means for supporting said cable on the spinning machine to extend along both sides thereof, and a doffer adapted to be driven by said cable.

8. In a doffer, a bobbin magazine mounted to travel horizontally and being adapted to hold a plurality of rows of bobbins in an upright position, and a member mounted below the magazine and having a bobbin-receiving opening disposed at an angle with respect to the rows of bobbins, whereby as the magazine travels the bobbins in each row will drop one at a time through said opening.

9. In a doffer, a bobbin magazine having a series of parallel rows of vertical compartments each adapted to receive a bobbin in a vertical position, and means at the lower ends of said compartments adapted to support the bobbins therein, said means being movable to permit the bobbins to escape from the magazine.

10. In a doffer, a bobbin magazine having a plurality of rows of vertical bobbin compartments each adapted to receive a bobbin in a vertical position, and a plurality of independently operable slides mounted on the magazine and each normally obstructing the lower ends of a row of said compartments, said slides being withdrawable in a direction parallel to its row of compartments to permit the escape of bobbins.

11. In a doffer, a bobbin magazine having a plurality of transverse rows of vertical bobbin-receiving tubes and a series of slides operating transversely in the bottom of the magazine, one between every two rows of tubes, said slides normally supporting the bobbins and having recesses in their edges adapted to be moved into register with said tubes to permit the bobbins to escape from the magazine.

12. In a doffer, a traveling supporting frame, a horizontal guideway thereon, a magazine slidable on said guideway, a rack on the magazine, a pinion meshing with said rack, and means for driving said pinion to feed the magazine.

13. A doffer comprising a horizontal guiding member, a magazine mounted to slide on said member and having transverse rows of vertical compartments adapted to receive individual bobbins in an upright position, means on the magazine normally closing the lower ends of said compartments, a guide tube mounted beneath the magazine, the upper end of said tube being disposed at an angle to the rows of bobbins in the magazine, a horizontal plate projecting from the top of said guide tube opposite to the direction of travel of the magazine, and stationary means adapted to open said compartment-closing means to permit the bobbins to descend onto said plate.

14. In a doffer, a bobbin magazine mounted to travel horizontally and being adapted to hold a plurality of rows of bobbins in an upright position, a guide tube below the magazine and a plate having its edge adjacent to said tube inclined with reference to the rows of bobbins, said plate being adapted to support bobbins in the magazine, the bobbins being slid along said plate by the magazine and dropping into the guide tube one at a time as they pass said inclined edge.

15. The combination of a spinning machine, a doffer arranged to travel longitudinally along one side of the machine and doff the bobbins therefrom, and means permanently mounted on the spinning machine for driving said doffer.

16. The combination of a spinning frame having a horizontal guide-rail thereon extending along one of its sides, a doffing machine adapted to be removably mounted on said guide-rail to travel therealong, and movable means extending longitudinally along said side of the spinning frame and arranged to drive the doffing machine.

17. The combination of a spinning machine having driving means permanently mounted thereon, and a traveling doffing machine adapted to be removably associated with the spinning machine and having means to provide a releasable driving engagement with said driving means.

18. The combination of a spinning machine, a doffer adapted to be removably mounted on the spinning machine to travel along the side of said machine and doff bobbins therefrom, and means mounted independently of the doffer for driving the doffer.

19. The combination of a spinning machine, a doffer adapted to travel along the side of the spinning machine and doff bobbins therefrom, and means mounted independently of the doffer for driving said doffer, the latter being releasable and bodily withdrawal from said driving means and from the spinning machine.

20. The combination of a spinning machine, a doffer adapted to travel along the side of the spinning machine and doff bobbins therefrom, and driving means permanently mounted with respect to said spinning machine and arranged to actuate the doffer, the latter having a releasable driving engagement with said driving means and being bodily withdrawable therefrom and from the spinning machine.

21. A spinning machine having a flexible driving element mounted thereon and extending along one side thereof, a driving connection between said element and a running part of the spinning machine, and a doffing machine adapted to be actuated by said flexible element.

22. A spinning machine having a flexible driving element extending along one side thereof, means for driving said element, and a doffing machine having means adapted to engage said element for actuating the doffing machine.

23. A doffing machine comprising a body, a bobbin magazine having a plurality of bobbin compartments, movable stops on said magazine for preventing the escape of bobbins therefrom, a stationary cam on said body, and means for relatively moving said magazine and said body to carry said stops into engagement with said cam, whereby to withdraw said stops successively to permit the discharge of the bobbins from the magazine.

24. In a doffing machine, the combination of a bobbin magazine having withdrawable means for preventing the escape of bobbins therefrom, and stationary cam means arranged to operate said withdrawable means to permit the descent of bobbins from the magazine, said magazine and said cam means being arranged for relative movement to bring said cam means into engagement with said withdrawable means.

25. In a doffing machine, the combination of a body portion and a magazine arranged to have a movement with relation to each other, withdrawable means on the magazine normally preventing the escape of bobbins therefrom, and a stationary cam on said body arranged to withdraw said withdrawable means during the relative motion between said body and said magazine, whereby to permit the discharge of bobbins from the magazine.

26. In a doffing machine, the combination of a magazine having a plurality of bobbin compartments therein, a plurality of movable stops on the magazine normally preventing the escape of bobbins therefrom, a body portion arranged to have a relative movement with respect to said magazine, a donning tube mounted on said body portion and adapted to receive bobbins from said magazine, and a cam stationarily mounted on the said body portion and arranged to successively engage said stop members and move them into position to permit descent of the bobbin of the magazine into said donning tube.

27. In a doffing machine, the combination of a framework having a straight horizontal guide thereon, a magazine supported by said framework to travel along said guide, said magazine having a plurality of vertical compartments, each adapted to hold an individual bobbin in an upright position, means for causing the magazine to travel along said guide, and means for releasing bobbins from the magazine.

28. In a doffer, the combination of a bobbin magazine adapted to contain a row of bobbins, a member positioned beneath the magazine adapted to support the bobbins in the magazine, said member having an inclined edge, and means for imparting a relative movement between said magazine and said member, whereby the bobbins will be moved off said inclined edge and drop successively from the magazine.

29. In a doffer, the combination of a framework, and a bobbin magazine mounted to travel horizontally with relation to said framework, said magazine having a plurality of individual bobbin compartments arranged to hold a plurality of parallel rows of bobbins in an upright position, and means for effecting the successive escape of the bobbins from the magazine.

30. In a doffer, a magazine having a plurality of vertical tubes, each adapted to contain a single bobbin in an upright position, said tubes being arranged in a plurality of parallel rows, and withdrawable means mounted in the lower portion of the magazine to obstruct the lower ends of said tubes, and prevent the escape of bobbins therefrom.

31. In a doffer, a bobbin magazine having a plurality of vertical tubes arranged in parallel rows, and a slide mounted between a pair of said rows and having portions obstructing the lower ends of the tubes in both rows said slide being withdrawable to permit the descent of bobbins out of the tubes.

32. In a doffing machine, in combination, a bobbin magazine having a plurality of bobbin receiving compartments, and a guide-tube positioned beneath said magazine, the upper end of said guide-tube being flared or enlarged to underlie a plurality of said bobbin receiving compartments.

33. In a doffer, the combination of a framework having a horizontal guide-way, a bobbin magazine supported upon the framework for movement along said guide-way, a rack-bar fixed to said magazine, a vertical shaft mounted in the framework and operatively connected at its upper end with said rack-bar and means for intermittently rotating the said vertical shaft to move said magazine step by step along said guide-way.

34. In doffing mechanism, the combination of a framework, a magazine mounted to travel horizontally with relation to said framework, said magazine having a plurality of withdrawable latches to support the bobbins therein, means for moving the magazine with relation to the framework, a stationary cam on the framework adapted to engage said latches and withdraw them successively to permit the bobbins to escape, a plate adapted to receive the descending bobbins upon withdrawal of one of said latches, and a donning tube into which the bobbins are moved from said plate, said donning tube and the edge of the plate extending at an angle to the bobbins in the magazine.

35. In doffing mechanism, in combination, a framework, a magazine mounted to travel horizontally with relation to the framework, said magazine having a plurality of vertical compartments arranged to hold bobbins in parallel rows, and having latches at the lower end of said compartments, means to withdraw said latches successively, a plate mounted in the framework beneath the magazine adapted to receive the bobbins when the latches are withdrawn, said plate having an edge inclined with relation to the rows of bobbins, and means for advancing the magazine to move the bobbins off said inclined edge.

In testimony whereof we affix our signatures in the presence of two witnesses.

ARTHUR GEORGE BOOZER, Jr.
GEORGE HILL.

Witnesses:
S. B. MOORE,
W. E. COLLINS.

Copies of this patent may be obtained for five cents each, by addressing the "Commissioner of Patents, Washington, D. C."